(12) United States Patent
Banks, Jr. et al.

(10) Patent No.: US 11,019,767 B2
(45) Date of Patent: Jun. 1, 2021

(54) FOLDING AUGER COUPLING MECHANISM

(71) Applicant: CNH Industrial America LLC, New Holland, PA (US)

(72) Inventors: Clayton E. Banks, Jr., Brownstown, PA (US); Cooper Linde, Lancaster, PA (US); William Mark McCully, Kingsfisher, OK (US)

(73) Assignee: CNH Industrial America LLC, New Holland, PA (US)

( * ) Notice: Subject to any disclaimer, the term of this patent is extended or adjusted under 35 U.S.C. 154(b) by 283 days.

(21) Appl. No.: 16/175,062

(22) Filed: Oct. 30, 2018

(65) Prior Publication Data
US 2020/0128736 A1 Apr. 30, 2020

(51) Int. Cl.
*A01F 12/46* (2006.01)
*A01D 41/12* (2006.01)
*A01D 61/00* (2006.01)
*B65G 33/32* (2006.01)

(52) U.S. Cl.
CPC ......... *A01D 41/1217* (2013.01); *B65G 33/32* (2013.01)

(58) Field of Classification Search
CPC ............ A01B 73/00–067; A01F 12/46; B65G 33/32; B65G 33/14; A01D 61/00; A01D 61/004; A01D 41/1217; A01D 41/144
USPC .................................................. 198/666, 668
See application file for complete search history.

(56) References Cited

U.S. PATENT DOCUMENTS

| | | | | |
|---|---|---|---|---|
| 2,772,767 A | * | 12/1956 | Seifert | B60P 1/40 198/632 |
| 3,337,068 A | * | 8/1967 | Meharry | B60P 1/40 414/523 |
| 3,638,816 A | * | 2/1972 | Mann | B65G 41/002 414/504 |
| 3,664,444 A | | 5/1972 | Henson | |
| 4,368,003 A | * | 1/1983 | MacDonald | A01B 73/065 111/57 |
| 4,440,539 A | * | 4/1984 | Sullivan | B65G 41/002 198/583 |
| 4,669,945 A | | 6/1987 | Pollard et al. | |
| 5,100,281 A | | 3/1992 | Grieshop | |
| 5,340,265 A | * | 8/1994 | Grieshop | B60P 1/40 414/519 |
| 5,673,543 A | * | 10/1997 | Richardson | A01D 41/144 56/228 |

(Continued)

OTHER PUBLICATIONS

Extended European Search Report for EP Application No. 19206329.5 dated Apr. 14, 2020 (five pages).

*Primary Examiner* — Adam J Behrens
(74) *Attorney, Agent, or Firm* — Peter Zacharias; Patrick Sheldrake

(57) ABSTRACT

A foldable auger having a first and second auger assemblies, each having a respective housing, auger screw and rotation axis. A pivot joins the assemblies, and is configured to permit the second auger assembly to fold relative to the first auger assembly. A first drive coupler is located at an end of the first auger screw and offset from the first axis, and a second drive coupler is located at an end of the second auger screw and offset from the second axis. A drive sleeve is rigidly connected to the end of the second auger screw. The drive sleeve has at least one slot that slidingly receives the second drive coupler. The second drive coupler is movable between a first position in driving connection with the first drive coupler, and a second position not in driving connection with the first drive coupler.

17 Claims, 5 Drawing Sheets

(56) References Cited

U.S. PATENT DOCUMENTS

| | | | | |
|---|---|---|---|---|
| 5,724,798 A * | 3/1998 | Stefl | .................... | A01D 41/144 |
| | | | | 172/311 |
| 6,422,376 B1 * | 7/2002 | Nichols | ................. | B65G 33/32 |
| | | | | 198/632 |
| 7,168,554 B2 | 1/2007 | Brandt | | |
| 7,287,639 B2 | 10/2007 | Brandt | | |
| 7,367,881 B2 * | 5/2008 | Voss | ................... | A01D 41/1217 |
| | | | | 414/526 |
| 7,494,409 B2 * | 2/2009 | Voss | ................... | A01D 41/1217 |
| | | | | 460/114 |
| 8,033,377 B2 * | 10/2011 | Reimer | ................. | B65G 33/32 |
| | | | | 198/313 |
| 8,827,782 B2 * | 9/2014 | Dise | ....................... | B65G 33/32 |
| | | | | 460/114 |
| 9,723,783 B2 * | 8/2017 | Patterson | ............... | B65G 33/32 |
| 10,399,787 B2 * | 9/2019 | Rodrigues | ............. | A01D 90/02 |
| 2007/0102260 A1 * | 5/2007 | Reimer | ................. | B65G 33/32 |
| | | | | 198/313 |
| 2014/0066149 A1 * | 3/2014 | Dise | ....................... | A01F 12/46 |
| | | | | 460/114 |
| 2015/0296709 A1 * | 10/2015 | Patterson | ............... | B65G 33/32 |
| | | | | 414/468 |
| 2016/0319857 A1 * | 11/2016 | Patterson | .................. | F16D 1/06 |
| 2017/0265389 A1 * | 9/2017 | Rodrigues | ............. | B65G 33/14 |

* cited by examiner

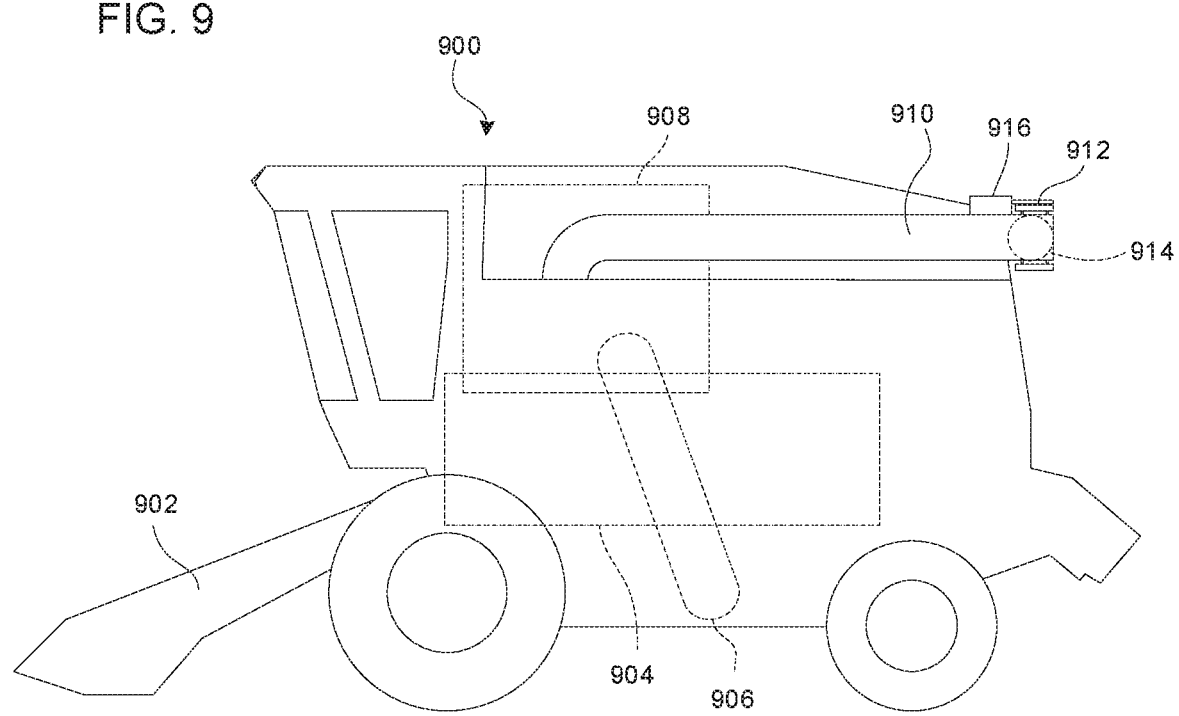

FOLDING AUGER COUPLING MECHANISM

BACKGROUND OF THE INVENTION

Some agricultural machines have an auger that is used to convey separated grain or other material from the machine to other locations. For example, an agricultural combine typically has an auger that is used to unload grain from a grain tank on the combine to an external grain cart or other receptacle. A typical auger includes an auger screw located inside a cylindrical housing. Rotation of the auger screw carries grain or other material along the length of the housing until it is expelled out the end of the housing.

In some cases, it is desirable for the auger to be retractable to protect the auger when it is not in use and to allow the equipment to be more maneuverable and to navigate through smaller spaces. Retractable augers have been provided in various configurations. For example, it is known to make the auger screw and housing as a unitary assembly that can be pivoted relative to the combine to place the auger alongside the combine's body. In this case, the entire length of the auger may be moved as a single unit relative to the rest of the equipment.

It is also known to make an auger foldable to allow the overall length of the auger to be reduced or to better conform the retracted auger to the shape of the combine. In such cases the auger includes a folding joint connecting a first auger screw and its associated housing with a second auger screw and its associated housing. Examples of such devices are shown in U.S. Pat. Nos. 8,033,377; 8,827,782; 7,494,409; 7,367,881; 7,287,639 and 7,168,554.

In some cases, a folding auger system has been provided with a mechanism to help align the two auger screws when the system is unfolded for use. For example, in the device shown in U.S. Pat. No. 8,033,377, a driving auger has a drive cog mounted on a spring to allow the drive cog to retract if it is aligned directly with the driven cog of the driven auger during unfolding. Subsequent rotation of the driving auger turns the driving cog, and the spring extends to move the driving cog so that the driven cog is in the rotation path of the driving cog. As another example, U.S. Pat. No. 7,494,409 shows a drive auger having a ball-shaped drive cog, and a driven auger having a cylindrical receptacle for receiving the drive cog and aligning the two auger screws during unfolding. The receptacle has a driven cog mounted therein, and the drive cog is mounted on springs that allow it to retract somewhat if the drive cog's teeth are not perfectly aligned with the driven cog's teeth during initial engagement. As another example, U.S. Pat. No. 7,287,639 shows an entire auger screw being mounted to shift axially to accommodate misalignment during unfolding.

While auger folding systems have been proposed, the inventors have identified problems with the known designs. For example, known designs have undue complexity, and proneness to becoming fouled by grain and other issues. For example, the device shown in U.S. Pat. No. 7,494,409 can be fouled by grain entering the receptacle for the ball-shaped drive cog. This device also has a sliding spline connection between the driven cog and the driven auger, which requires relatively expensive machining, and disadvantageously places the sliding connection at a region of relatively high torque. For these and other reasons, the inventors have determined that the state of the art still requires further advancement.

This description of the background is provided to assist with an understanding of the following explanations of exemplary embodiments, and is not an admission that any or all of this background information is necessarily prior art.

SUMMARY OF THE INVENTION

In one exemplary aspect, there is provided a foldable auger having a first auger assembly comprising a first housing extending along a first axis, and a first auger screw mounted within the first housing to rotate about the first axis, a second auger assembly comprising a second housing extending along a second axis, and a second auger screw mounted within the second housing to rotate about the second axis, and a pivot joining a distal end of the first housing to a proximal end of the second housing, the pivot being configured to permit the second auger assembly to move relative to the first auger assembly between a first housing position in which the second axis is not coaxially aligned with the first axis, and a second housing position in which the second axis is coaxially aligned with the first axis. A first drive coupler is located at a distal end of the first auger screw and offset from the first axis. A drive sleeve is located at a proximal end of the second auger screw and rigidly connected to the second auger screw, the drive sleeve comprising at least one slot offset from and extending parallel to the second axis. A second drive coupler is located at the proximal end of the second auger screw and offset from the second axis, the second drive coupler extending into the slot and being movable within the slot parallel to the second axis between a first coupler position in which the second drive coupler is in driving connection with the first drive coupler when the second housing is in the second position, and a second coupler position in which the second drive coupler is not in driving connection with the first drive coupler when the second housing is in the second position.

In another exemplary aspect, there is provided an agricultural combine having a grain hopper and a foldable auger operatively connected to the grain hopper. The foldable auger has a first auger assembly comprising a first housing extending along a first axis, and a first auger screw mounted within the first housing to rotate about the first axis, a second auger assembly comprising a second housing extending along a second axis, and a second auger screw mounted within the second housing to rotate about the second axis, and a pivot joining a distal end of the first housing to a proximal end of the second housing, the pivot being configured to permit the second auger assembly to move relative to the first auger assembly between a first housing position in which the second axis is not coaxially aligned with the first axis, and a second housing position in which the second axis is coaxially aligned with the first axis. A first drive coupler is located at a distal end of the first auger screw and offset from the first axis. A drive sleeve is located at a proximal end of the second auger screw and rigidly connected to the second auger screw, the drive sleeve comprising at least one slot offset from and extending parallel to the second axis. A second drive coupler is located at the proximal end of the second auger screw and offset from the second axis, the second drive coupler extending into the slot and being movable within the slot parallel to the second axis between a first coupler position in which the second drive coupler is in driving connection with the first drive coupler when the second housing is in the second position, and a second coupler position in which the second drive coupler is not in driving connection with the first drive coupler when the second housing is in the second position.

BRIEF DESCRIPTION OF THE DRAWINGS

Embodiments of inventions will now be described, strictly by way of example, with reference to the accompanying drawings, in which:

FIG. 9 illustrates an example of an agricultural combine for use with a foldable auger assembly.

In the figures, like reference numerals refer to the same or similar elements.

DETAILED DESCRIPTION OF THE DRAWINGS

Figure 1A:
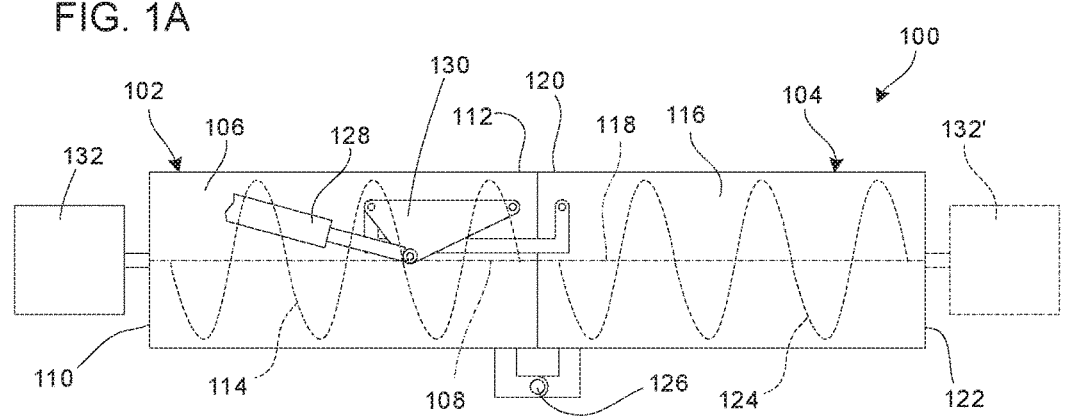
FIGS. 1A and 1B are schematic side views of a foldable auger assembly shown in unfolded and folded positions, respectively.

Exemplary embodiments of the present invention provide mechanisms for aligning and engaging auger screws during unfolding of an auger system. Such devices are expected to be useful on agricultural combines and other similar equipment, but the invention is not limited to any particular application except as recited in the claims.

FIGS. 1A through 3 illustrate a first exemplary embodiment of a foldable auger 100. The auger 100 has a first auger assembly 102 that is movably connected to a second auger assembly 104. In some applications, one of the two auger assemblies 102, 104 will be rigidly fixed to the frame or structure of a vehicle, such as a combine, and the other will be mounted to be movable relative to the vehicle frame or structure. The fixed auger assembly is sometimes referred to as an "inner" auger assembly, and the movable auger assembly is sometimes referred to as an "outer" auger assembly. In other applications, both of the auger assemblies 102, 104 might be movably attached to the vehicle.

The first auger assembly 102 includes a first housing 106 that extends along a first axis 108 from a proximal end 110 of the first auger assembly 102 to a distal end 112 of the first auger assembly 102. A first auger screw 114 is mounted within the first housing 106 on one or more bearings or bushings, such that it can rotate about the first axis 108. Such rotation will cause grain or other material inside the first housing 106 to advance along the first auger assembly 102, as known in the art.

The second auger assembly 104 includes a second housing 116 that extends along a second axis 118 from a proximal end 120 of the second auger assembly 104 to a distal end 122 of the second auger assembly 104. A second auger screw 124 is mounted within the second housing 116 on one or more bearings, such that it can rotate about the second axis 118. Such rotation will cause grain inside the second housing 116 to advance along the second auger assembly 104, as known in the art.

Figure 1B:
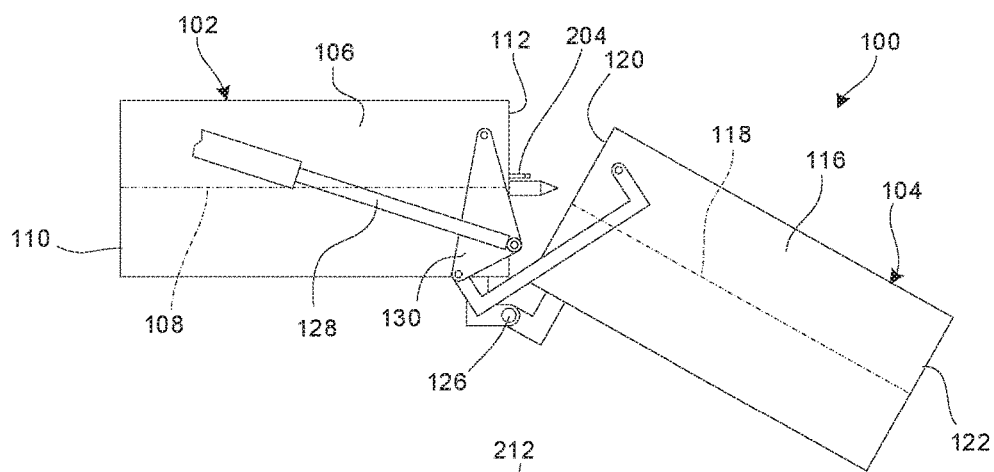

It is noted that the terms "proximal" and "distal" are used herein for ease of explanation, with the left-hand end of the first auger assembly 102 (as shown in FIGS. 1A and 1B) being the observational frame of reference. Such terminology is not intended to connote particular orientations of the parts except with respect to one another.

A pivot 126 connects the distal end 112 of the first auger assembly 102 to the proximal end 120 of the second auger assembly 104. The pivot 126 may be any suitable connection that allows the first auger assembly 102 and the second auger assembly 104 to move relative to one another between a first housing position in which the second axis 118 is not aligned with the first axis 108 (see, e.g., FIG. 1B), and a second housing position in which the second axis 118 is coaxially aligned with the first axis 108 (see, e.g., FIG. 1A). For example, the pivot 126 may be a pin joint that directly connects the first auger assembly 102 to the second auger assembly 104 via a common pin 200, for rotation about the pin's axis. Alternatively, the pivot 126 may comprise a virtual pivot mechanism, such as a linkage that causes the second auger assembly 104 to rotate or move about a fixed or moving virtual pivot location. The pivot 126 is described herein as permitting the second auger assembly 104 to move relative to the first auger assembly 102, and this will be understood to encompass situations in which either the first auger assembly 102 or the second auger assembly 104 is fixed relative to a vehicle or other structure.

Any suitable operation mechanism may be provided to cause the first auger assembly 102 and the second auger assembly 104 to rotate relative to one another. For example a hydraulic piston 128 may be used to operate a linkage 130 that interconnects the first auger assembly 102 and the second auger assembly, such as shown in FIGS. 1A and 1B. Other alternatives and variations will be apparent to persons of ordinary skill in the art in view of the present disclosure, and any such mechanism may be used to move the parts between the first housing position and the second housing position.

When the first auger assembly 102 and the second auger assembly 104 are in the first housing position, the two assemblies are not aligned with one another, and are in a folded state. In this condition, the auger assemblies 102, 104 do not form a continuous path for conveying grain or the like. This position may be adopted to store the foldable auger 100 when it is not in use.

When the first auger assembly 102 and the second auger assembly 104 are in the second housing position, the distal end of the first housing 106 contacts the proximal end of the second housing 116 to form a continuous enclosed passage for conveying grain or the like. One or both of the housings 106, 116 may include a seal 202, such as a flexible rubber seal or the like, to provide a more impermeable connection, such as known in the art. Also in the second housing position, the first auger screw 114 engages the second auger screw 124 to form a continuous auger screw for moving grain or the like along the auger 100.

A drive coupler system is provided between the first auger screw 114 and the second auger screw 124, so that the two auger screws 114, 124 can be moved in unison upon application of an operating torque by a motor 132. In the shown example, the motor 132 is operatively connected to the first auger screw 114 to apply an operating torque to the first auger screw regardless of the position of the second auger assembly 104. When the second auger assembly 104 is in the second housing position, the first auger screw 114 can transmit the operating torque (or at least a portion thereof, as some might be lost through friction or other typical driveline losses) from the motor 132 to the second auger screw 124. However, the opposite arrangement may be used, in which case motor 132 will be replaced by motor 132' driving the second auger screw 124. Any driving connection may be provided between the motor 132, 132' and the respective auger screw 114, 124. For example, a torque-transmitting connection may be provided in the form of belts and pulleys, meshing gears, or a simple direct drive connection. Other devices, such as a clutch, transmission, speed controls and so on may also be used to operate the motor 132 and drive the auger screws 114, 124.

Figure 2:
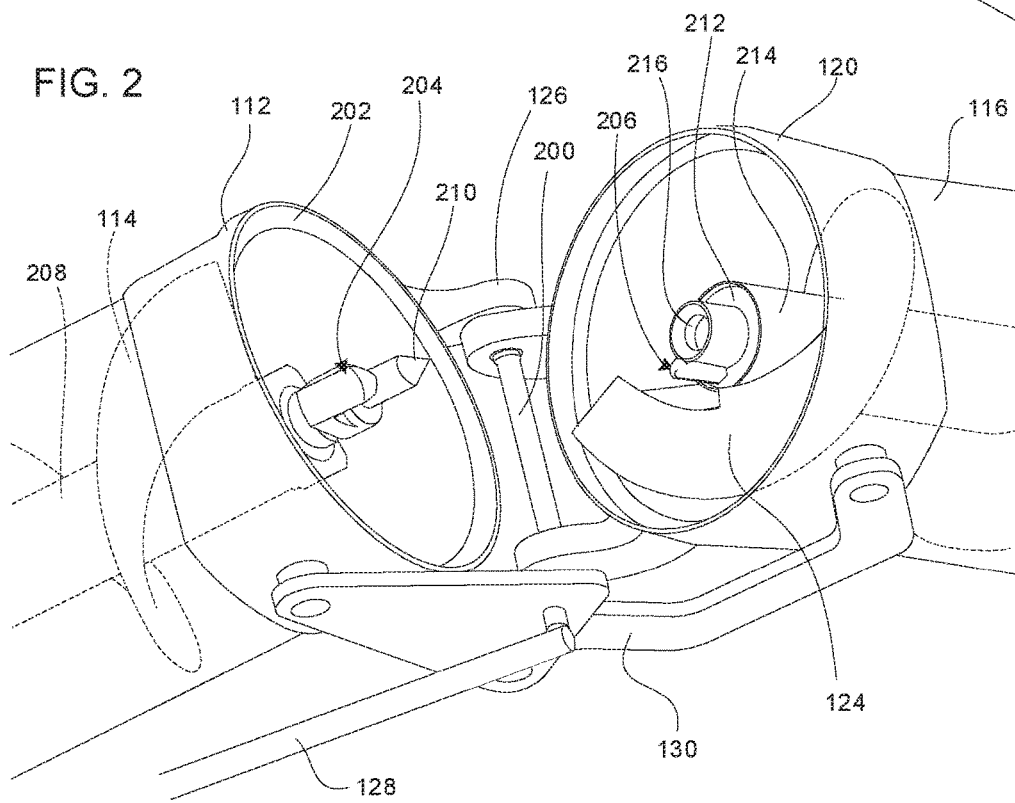
FIG. 2 is an isometric view of an exemplary drive coupler system usable on the foldable auger assembly of FIGS. 1A and 1B.

Referring now more specifically to FIG. 2, and exemplary drive coupler system has a first drive coupler 204 located at the distal end of the first auger screw 114, and a second drive coupler 206 located at the proximal end of the second auger screw 124. The first drive coupler 204 is offset from the first axis 108 and connected to rotate with the first auger screw 114. Thus, the first drive coupler 204 sweeps through a circular path that is offset from the first axis 108 as the first auger screw 114 rotates. Similarly, the second drive coupler 206 is offset from the second axis 118 and connected to rotate with the second auger screw 124. Thus, the second drive coupler 206 sweeps through its own circular path that is offset from the second axis 118 as the second auger screw 124 rotates. The circular path of the first drive coupler 204 overlaps with the circular path of the second drive coupler 206 when the second auger assembly 104 is in the second housing position. Thus, the first and second drive couplers 204, 206 engage one another transmit the operating torque between the first and second auger screws 114, 124.

The first drive coupler 204 may be connected to rotate with the first auger screw 114 using any conventional connection. For example, the first drive coupler 204 may comprise a rigid structure that is bolted to or otherwise rigidly attached to the central shaft 208 of the first auger screw 114. The first drive coupler 204 also may include a mechanism to help center the first auger screw 114 on the second auger screw 124, such as a centering post 210 that extends along the first axis 108. The centering post 210 may terminate at a tapered distal tip to help accommodate for misalignment of the part during movement from the first housing position to the second housing position.

The second drive coupler 206 is connected to rotate with the second auger screw 124 by a drive sleeve 212, which is rigidly connected to a central shaft 214 of the second auger screw 124. Details of exemplary drive sleeves 212 are discussed in more detail below. The second drive coupler 206 also may include a mechanism to help center the second auger screw 124 on the first auger screw 114, such as a centering post receptacle 216 that extends along the second axis 118 and is shaped to receive the centering post 210 when the parts are in the second housing position. The centering post receptacle 216 may have a tapered inlet to help accommodate for misalignment when the parts are moved into the second housing position.

Figure 3:
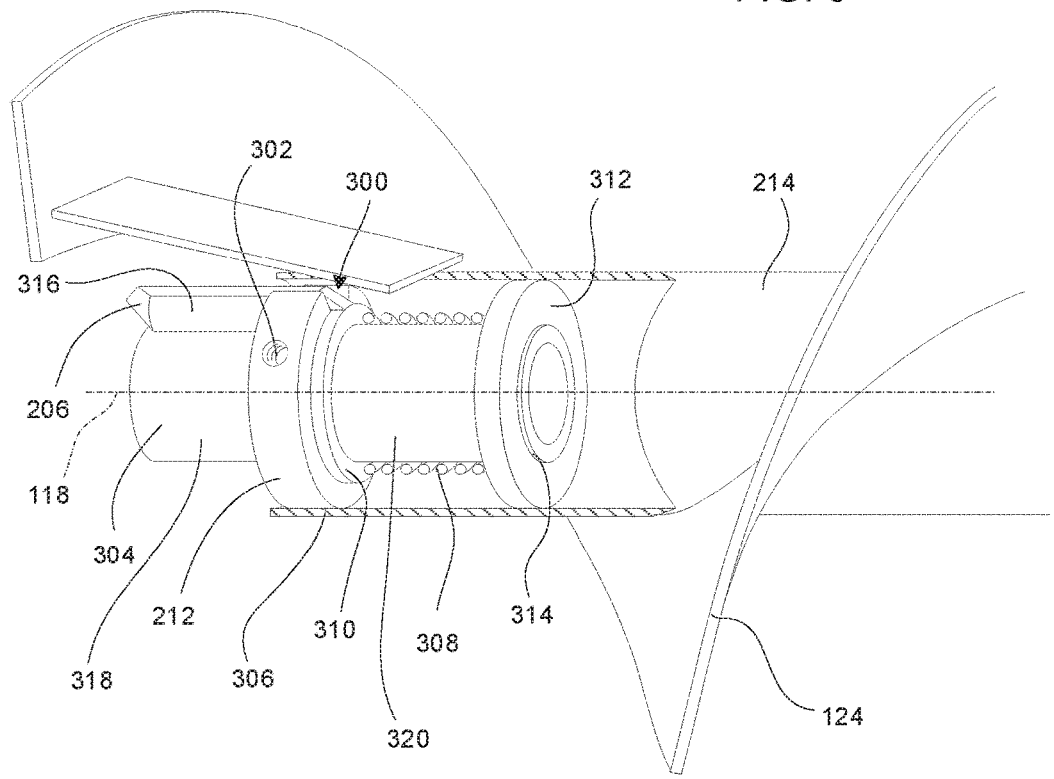
FIG. 3 is a partially cut away view of a proximal end of an exemplary drive coupler.
Figure 4:
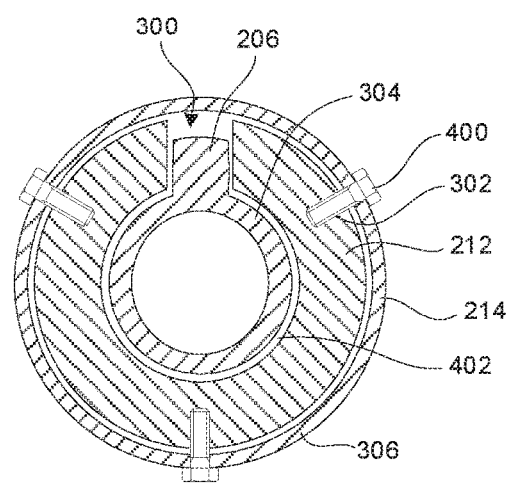
FIG. 4 is a cross-sectional view of a portion of the example of FIG. 3.
Figure 5:
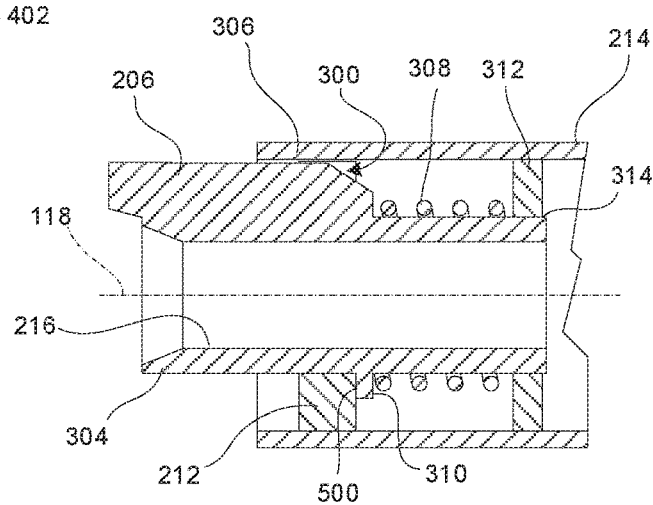
FIG. 5 is another cross-sectional view of another portion of the example of FIG. 3.

Referring now to FIGS. 3 through 5, an exemplary drive sleeve 212 is rigidly connected to the proximal end of the second auger screw 124, and has at least one slot 300 that is offset from and extends parallel to the second axis 118. The drive sleeve 212 may be rigidly connected to the second auger screw 124 using any suitable mechanism. For example, the second auger screw 124 may comprise a hollow shaft 306, and the drive sleeve 212 may be installed within the hollow shaft 306. One or more screws 400 may be inserted through corresponding holes in the central shaft 214 and secured to threaded holes 302 extending radially into the drive sleeve 212. Alternatively, the drive sleeve 212 may have a threaded outer surface that engages threads formed internally to the hollow central shaft 214, or it may be welded, brazed or clamped into place. The drive sleeve 212 also may be attached to a proximal end of the second auger screw 124. The rigid connection between the drive sleeve 212 and the second auger screw 124 prevents the drive sleeve 212 from rotating relative to the second auger screw 124.

As best shown in FIG. 4, the drive sleeve 212 may be formed as an annular ring having a central opening 402 and the slot 300 may be formed as a gap in the annular ring that extends entirely from the outer perimeter of the ring to the central opening 402. However, this is not strictly required. In other embodiments, the slot 300 may extend only partially through the annular ring, or be formed as an axial hole in the annular ring. In other embodiments, the drive sleeve 212 may not have an annular central opening 402. For example, in the embodiment of FIG. 8, discussed below, the drive sleeve 212 may have one or more slots located at radial positions offset from the second axis 118, and the central opening 402 may be replaced by a solid surface to which a centering post 210 is rigidly attached.

At least a portion of the second drive coupler 206 is located at a radial offset distance from the second axis 118 that overlaps the location of the slot 300. The second drive coupler 206 is captured within the slot 300 such that it cannot move about the second axis 118 without pressing laterally against the slot 300 walls to apply a rotation torque to turn the second auger screw 124.

Figure 6A:
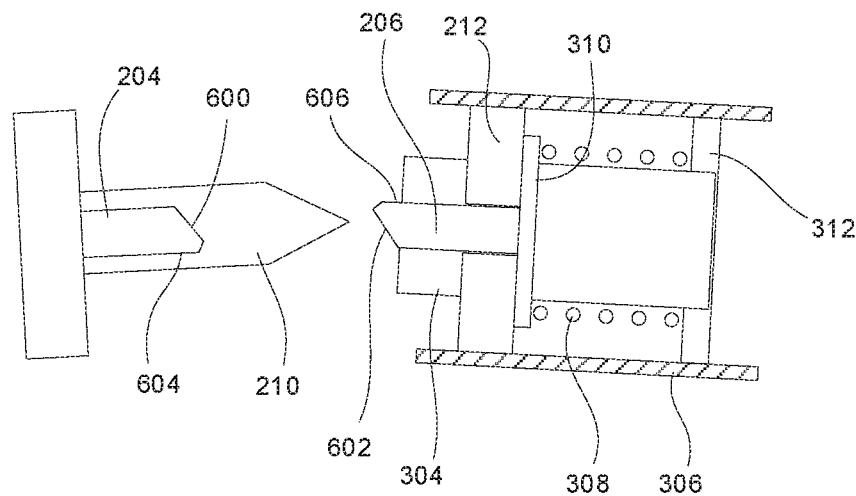
FIGS. 6A-6C illustrate the operation of exemplary drive couplers.
Figure 6B:
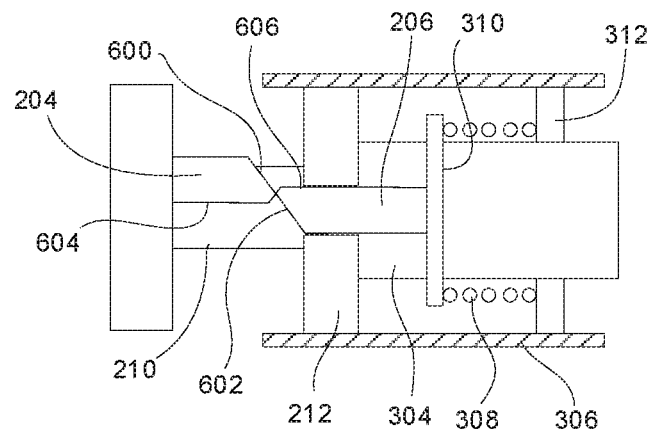

The second drive coupler 206 is also slidable within the slot 300, in a direction parallel to the second axis 118, between a first coupler position (see, e.g., FIGS. 5, 6A and 6C) and second coupler position (see, e.g., FIG. 6B). In the first coupler position, the second drive coupler 206 is displaced in the proximal direction from the second auger screw 124. In the second coupler position, the second drive coupler 206 is displaced in the distal direction relative to the first coupler position (i.e., it is moved distally with respect to the second auger screw 124).

The sliding connection between the second drive coupler 206 and the drive sleeve 212 may include one or more sliding bearings or bushings to allow smooth movement between the parts. For example, in the embodiment shown in FIGS. 3 through 5, the second drive coupler 206 is connected to a slider 304 (which may have a centering post receptacle 216 located therein), which may be located along the second axis 118. The slider 304 passes through the annular opening 402 in the drive sleeve 212, and the abutting faces of the slider 304 and annular opening 402 may include suitable bearing surfaces (e.g., bushing material or the like) to provide low friction contact therebetween. FIG. 4 shows a small gap between the slider 304 and the annular opening 402, but this is not strictly required, and the two parts may be in constant contact to provide controlled movement along the second axis 118 without permitting rotation or lateral displacement relative thereto. The engaging surfaces of the second drive coupler 206 and the slot 300 may also have bearing materials to reduce friction therebetween.

In the shown example, the slider 304 has a cylindrical outer wall that matches the annular opening 402, but this is not strictly required. For example, the slider 304 may have a square cross-sectional profile as viewed along the second axis 118, and the annular opening 402 may be replaced by a similarly-shaped square opening. Other alternatives and variations will be apparent to persons of ordinary skill in the art in view of the present disclosure.

One or more mechanisms may be provided to bias the second drive coupler 206 towards the first coupler position. For example, one or more springs 308 may be provided between facing surfaces of the second drive coupler 206 and the second auger screw 124 to generate a resilient biasing force that allows the second drive coupler 206 to slide to the second coupler position application of a force to compress the spring 308, but returns the second drive coupler 206 to the first coupler position when such force is removed.

In the shown example, a single coil spring 308 is provided, preferably within the hollow shaft 306, to bias the second drive coupler 206 towards the first coupler position. The coil spring 308 surrounds the slider 304, and is located between a distally-facing surface 310 of the slider 304, and a proximally-facing surface of a support plate 312 that is also located within the hollow shaft 306 of the second auger screw 124. The support plate 312 is rigidly mounted to the second auger screw 124, and the drive sleeve 212 is fixed between the proximal end of the second auger screw and the support plate 312. As best shown in FIG. 5, the distally-facing surface 310 of the slider 304 may be formed as part of an annular protrusion that also has a proximally-facing surface 500 that abuts the drive sleeve 212 when the second drive coupler 206 is in the first coupler position. The annular protrusion may be formed integrally with the slider 304, or attached thereto (e.g., as a circular clip that fits in an annular groove in the slider 304).

As shown in FIGS. 3 and 5, the support plate 312 may include a bearing passage 314 that extends along the second axis 118 and is shaped to receive the outer surface of the slider 304 to provide a second point of bearing support to the slider 304. Thus, the drive sleeve 212 and support plate 312 both provide a respective bearing surface to hold the slider 304 and the attached second drive coupler 206. The second drive coupler 206 is formed as a cog 316 that extends radially with respect to the second rotation axis from a first portion 318 of the slider 304. The first portion 318 of the slider 304 is slidingly received in the drive sleeve's bearing surface. A second portion 320 of the slider 304 is slidingly received in the support plate's bearing surface. The spring 308 is located between the first portion 318 of the slider 304 two bearing surfaces, and retained in this position by the distally-facing surface 310.

While the foregoing construction is expected to provide good sliding support for the second drive coupler 206, it is not strictly required for the support plate 312 to have a bearing passage 314. For example, the support plate 312 may instead have a post that fits inside a corresponding bore 216 in the slider 306 to provide bearing support thereto, or it may simply comprises a flat plate that is spaced from the end of the slider 306 when the slider 306 is in the second coupler position.

In the shown example of FIGS. 3 and 5, the support plate 312 is separate from the drive sleeve 212, and separately attached to the second auger screw 124. For example, the support plate 312 may be welded in place, held by fasteners such as screws, and so on. The support plate 312 also may be integrally formed with the central shaft 214 of the second auger screw 124. For example, the central shaft 214 may be formed as a hollow tube having an annular opening with a diameter that corresponds to the desired size of the bearing passage 314, and the hollow shaft 306 portion may be welded onto the end of the tube, or machined out of the end of the tube (e.g., the proximal end of the tube may be bored to a diameter corresponding to the outside diameter of the drive sleeve 212). Other alternatives and variations will be apparent to persons of ordinary skill in the art in view of the present disclosure.

It will also be appreciated that, in other embodiments, the single coil spring 308 may be replaced by multiple mechanical springs or resilient structures (e.g., a sleeve of rubber or elastomeric material, multiple coil springs, and so on), or it may be replaced by a hydraulic or pneumatic spring. The spring 308 also may be replaced by a manually- or automatically-operated actuator, such as a hydraulic piston that controls the position of the second drive coupler 206 relative to the second auger screw 124.

Figure 6C:
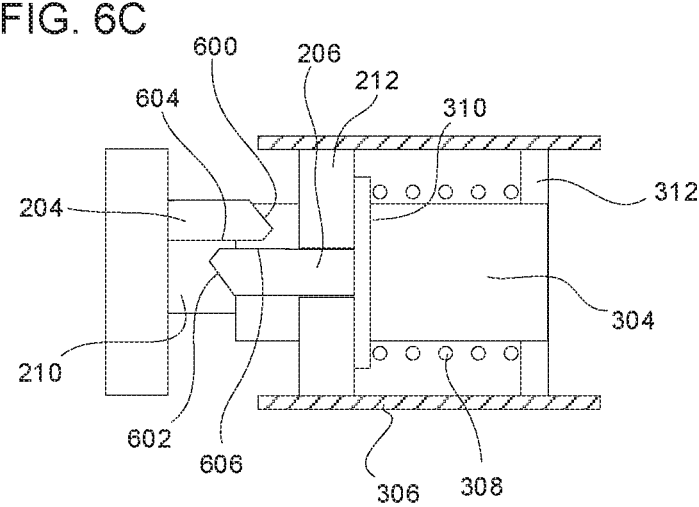

Referring now to FIGS. 6A through 6C, the first and second coupler positions are explained in more detail. FIG. 6A shows the first drive coupler 204 and second drive coupler 206 in the first housing position. (The remaining portions of the auger assemblies are omitted for clarity.) In this position, the spring 308 biases the second drive coupler 206 to the first coupler position, as discussed above. When the auger assemblies are folded as shown in FIG. 6A, the first drive coupler 204 is not in contact with the second drive coupler 206. It is possible that one or both auger screws 114, 124 might have rotated since the last time they were engaged with each other. Thus, the first drive coupler 204 and the second drive coupler 206 may be in position to contact one another when the auger assemblies are moved to the second housing position. Such contact can damage the parts.

FIG. 6B shows the situation in which the first and second auger assemblies are being moved to the second housing position, and the first drive coupler 204 has contacted the second drive coupler 206. The force of moving the auger assemblies to the second housing position has caused the first drive coupler 204 to press against the second drive coupler 206 to compress the spring 308 and move the second drive coupler 206 to the second coupler position. In this position, the second drive coupler 206 is moved distally to a point where it avoids impact loading, and the spring 308 may be partially or fully compressed.

When the second drive coupler 206 is in the second coupler position, the first drive coupler 204 is not in driving connection with the second drive coupler 206. That is, rotation of the first drive coupler 204 about the first axis 108 does not transmit a significant drive torque to the second drive coupler 206 to cause it to rotate about the second axis 118. This may be accomplished by providing the second drive coupler 206 with a sliding travel distance that is equal to or greater than the distance by which the first and second drive couplers 204, 206 overlap when the second drive coupler 206 is in the first coupler position. Thus, any drive torque transmitted by the first drive coupler 204 to the second drive coupler 206 would be via frictional contact between the facing surfaces 600, 602 of the parts, which is relatively minor and unlikely to cause rotation of the second auger screw 124 when loaded with grain or the like.

The facing surfaces 600, 602 of the first and second drive couplers 204, 206 also may be beveled with respect to the direction of rotation. The beveled surfaces 600, 602 can help cause the second drive coupler 206 to rotate slightly as the auger assemblies are being moved to the second housing position. Such rotation can place the first and second drive couplers 204, 206 into a non-interfering position, to help avoid damage and mitigate the requirement to fully compress the spring 308. The beveled facing surfaces 600, 602 may have double bevels, as shown, or single bevels. It will thus be appreciated that the situation shown in FIG. 6B occurs only when the facing surfaces 600, 602 contact each other but the torque generated by the abutting beveled surfaces is not sufficient to cause the second auger screw 124 to rotate far enough to avoid compressing the spring 308.

FIG. 6C illustrates the position that the first and second drive couplers 204, 206 assume when the first and second housing assemblies are in the second housing position (i.e., extended for operation), and the second drive coupler 206 is in the first coupler position. This position may be obtained from the position in FIG. 6B by rotating one or both of the first auger screw 114 and the second auger screw 124, either by operating a drive motor, by the action of contact between the beveled surfaces 600, 602, of a combination thereof. In the position of FIG. 6C, the first drive coupler 204 comprises a respective cog having a first drive face 604 that extends parallel to the first axis 108, and the second drive coupler 206 comprises a respective cog having second drive face 606 extending parallel to the second axis 118. The first drive face 604 and the second drive face 606 overlap one another in the circumferential direction. Thus, the drive faces 604, 606 are positioned to transfer rotational torque between the first auger screw 114 and the second auger screw 124. This is the primary operative position of the foldable auger assembly, in which a drive torque applied to one or the other of the first auger screw 114 and the second auger screw 124 is transmitted by the first and second drive couplers 204, 206 to rotate the other auger screw.

Figure 7A:
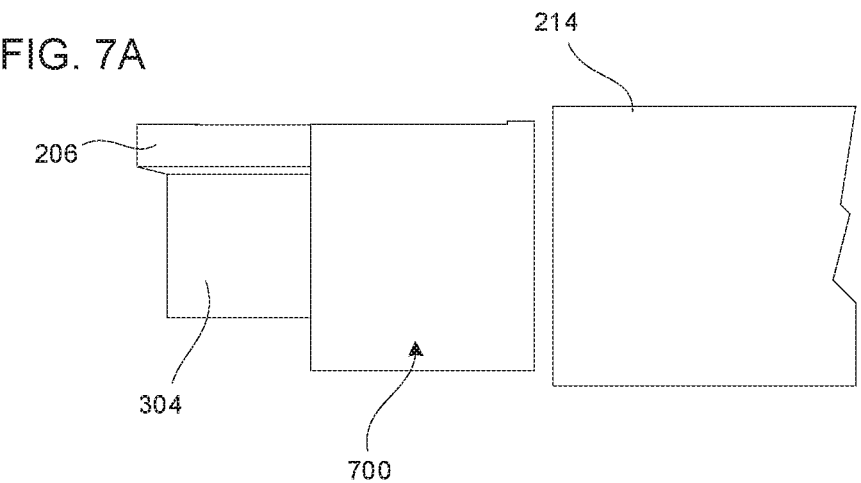
FIGS. 7A and 7B illustrate an alternative exemplary embodiment of a drive coupler provided as a unitary structure.
Figure 7B:
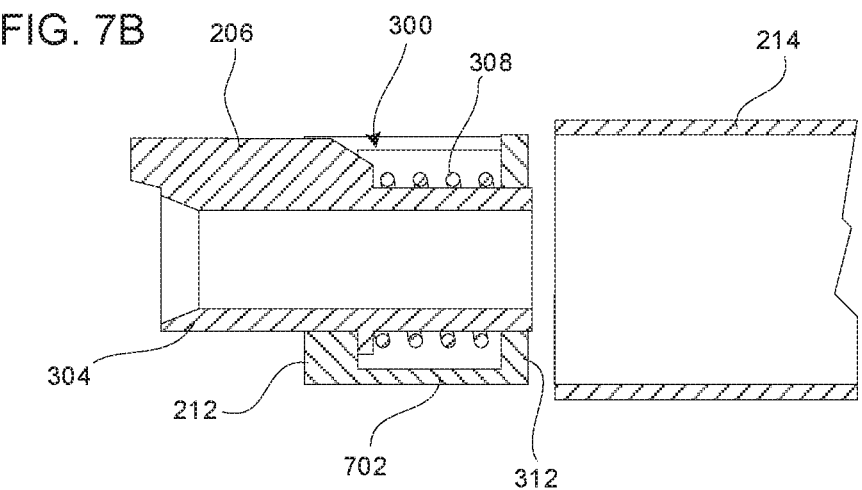

It will be appreciated that exemplary embodiments also may have somewhat different constructions than the previously-discussed examples. For example, FIG. 7A shows an example of a second drive coupler 206 that is fitted to a unitary drive sleeve 212 and support plate 312 assembly 700. The drive sleeve 212 is connected to the support plate 312 by a common continuous wall 702 or by one or more connectors (e.g., posts that are threaded at each end to the drive sleeve 212 and support plate 312. Thus, the entire second drive coupler assembly 700 can be installed into or attached to the second auger screw shaft 214 as a unitary assembly. This is expected to facilitate manufacture of the parts and retrofitting existing auger screw assemblies.

Figure 8:
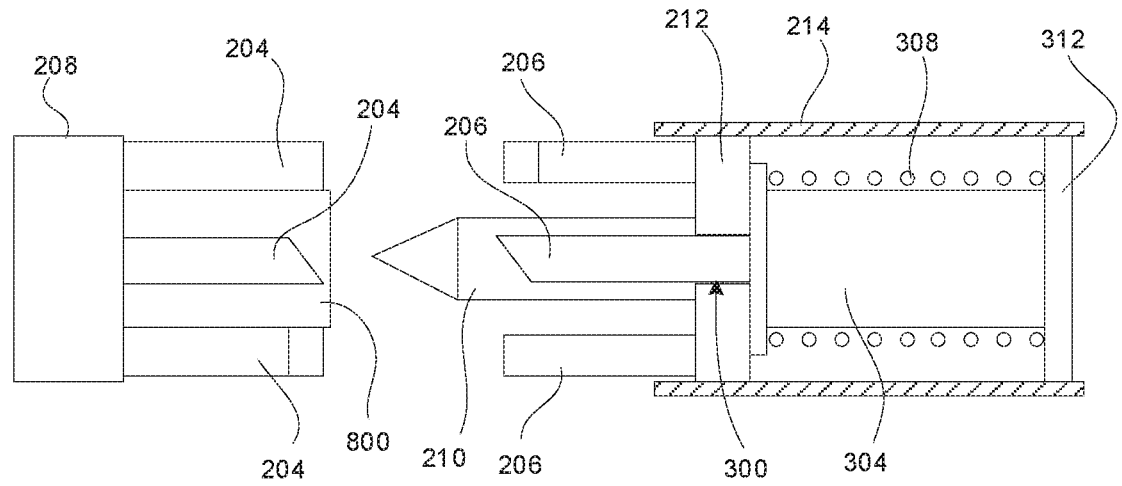
FIG. 8 illustrates another example of an exemplary embodiment of a drive coupler system.

FIG. 8 illustrates example of other alternative features of exemplary embodiments. In this example, the first drive coupler 204 and second drive coupler 206 each comprise a plurality of cogs that extend parallel to the respective axis 108, 118, rather than a single cog. It is also envisioned that one drive coupler could have multiple cogs, and the other could have a single cog. The cogs of the second drive coupler 206 are mounted to a common slider 304, but they may be mounted to separate sliders. One or more springs 308 bias the cogs of the second drive coupler 206 towards the first coupler position (shown). In this case, the drive sleeve 212 comprises a plurality of slots 300, with one or more cogs being located in each slot 300.

FIG. 8 also shows the centering post 210 being associated with the second drive coupler 206, and a post receptacle 800 being associated with the first drive coupler 204. In this case, the centering post 210 may be mounted to the slider 304 to move with the second drive coupler 206, or it may be mounted rigidly to the drive sleeve 212 or support plate 312. Other alternatives and variations will be apparent to persons of ordinary skill in the art in view of the present disclosure.

FIG. 9 schematically illustrates an agricultural combine 900 that can be used in conjunction with a foldable auger assembly such as those described herein. The combine 900 generally comprises a wheel- or track-driven vehicle having a header 902 to cut and draw in crops, an internal threshing and separating system 904 to separate grain from other material, and a grain elevator 906 to lift the separated grain to a grain hopper 908. A first auger assembly 910 is attached to the remainder of the combine 900 at a first end that is in communication with the grain hopper 908. The first auger assembly 910 may be operatively connected to the grain hopper 908 by, for example, a grain extraction auger that extends from the bottom of the hopper to the first auger assembly. Alternatively, the first end of the first auger assembly may be positioned within the grain hopper 908 to directly extract grain therefrom. The second end of the first auger assembly 910 is attached via a linkage 912 to a second auger assembly 914.

In this case, the first auger assembly 910 extends rearward, and the second auger assembly 914 is folded to extend across the back end of the combine 900. It will be appreciated that the first auger assembly 910 can be pivotally mounted to swing laterally, and other different orientations may be used. The first auger assembly 910 also may protrude laterally from the combine, and the second auger assembly 914 may fold backwards to extend along the side of the combine, and extend sideways to an operative position to connect to the first auger assembly to direct grain laterally from the combine. In any event, a motor 916 (e.g., electric motor, hydraulic piston, etc.) is provided to operate the linkage 912 to fold and extend the second auger assembly 916. Other alternatives and variations will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:
1. A foldable auger comprising:
 a first auger assembly comprising a first housing extending along a first axis, and a first auger screw mounted within the first housing to rotate about the first axis;
 a second auger assembly comprising a second housing extending along a second axis, and a second auger screw mounted within the second housing to rotate about the second axis;
 a pivot joining a distal end of the first housing to a proximal end of the second housing, the pivot being configured to permit the second auger assembly to move relative to the first auger assembly between a first housing position in which the second axis is not coaxially aligned with the first axis, and a second housing position in which the second axis is coaxially aligned with the first axis;
 a first drive coupler located at a distal end of the first auger screw and offset from the first axis;
 a drive sleeve located at a proximal end of the second auger screw and rigidly connected to the second auger screw, the drive sleeve comprising an annular ring and at least one slot offset from and extending parallel to the second axis formed by a gap in the annular ring; and
 a second drive coupler located at the proximal end of the second auger screw and offset from the second axis, the second drive coupler extending into the slot and being movable within the slot parallel to the second axis between a first coupler position in which the second drive coupler is in driving connection with the first drive coupler when the second housing is in the second housing position, and a second coupler position in which the second drive coupler is not in driving connection with the first drive coupler when the second housing is in the second housing position.

2. The foldable auger of claim 1, wherein the second auger screw comprises a hollow shaft and the annular ring is secured to the second auger screw inside the hollow shaft.

3. The foldable auger of claim 1, wherein the second auger screw comprises a hollow shaft having a support plate located therein, the drive sleeve is fixed between the proximal end of the second auger screw and the support plate, and at least one spring is located within the hollow shaft between the drive sleeve and the support plate.

4. The foldable auger of claim 3, wherein the drive sleeve and the support plate are interconnected to form a subassembly that is attached as a unit to the second auger screw.

5. A foldable auger comprising:
a first auger assembly comprising a first housing extending along a first axis, and a first auger screw mounted within the first housing to rotate about the first axis;
a second auger assembly comprising a second housing extending along a second axis, and a second auger screw mounted within the second housing to rotate about the second axis, the second auger screw comprising a hollow shaft having a support plate located therein;
a pivot joining a distal end of the first housing to a proximal end of the second housing, the pivot being configured to permit the second auger assembly to move relative to the first auger assembly between a first housing position in which the second axis is not coaxially aligned with the first axis, and a second housing position in which the second axis is coaxially aligned with the first axis;
a first drive coupler located at a distal end of the first auger screw and offset from the first axis;
a drive sleeve is fixed between the proximal end of the second auger screw and the support plate, the drive sleeve comprising at least one slot offset from and extending parallel to the second axis; and
at least one spring located within the hollow shaft between the drive sleeve and the support plate and
a second drive coupler located at the proximal end of the second auger screw and offset from the second axis, the second drive coupler extending into the slot and being movable within the slot parallel to the second axis between a first coupler position in which the second drive coupler is in driving connection with the first drive coupler when the second housing is in the second housing position, and a second coupler position in which the second drive coupler is not in driving connection with the first drive coupler when the second housing is in the second housing position,
wherein the support plate comprises a bearing passage extending along the second axis, and the second drive coupler comprises a slider extending along the second axis and slidably received within the bearing passage.

6. The foldable auger of claim 1, wherein the second drive coupler comprises a slider extending along the second axis, and at least one cog extending radially with respect to the second rotation axis from a first portion of the slider.

7. A foldable auger comprising:
a first auger assembly comprising a first housing extending along a first axis, and a first auger screw mounted within the first housing to rotate about the first axis;
a second auger assembly comprising a second housing extending along a second axis, and a second auger screw mounted within the second housing to rotate about the second axis;
a pivot joining a distal end of the first housing to a proximal end of the second housing, the pivot being configured to permit the second auger assembly to move relative to the first auger assembly between a first housing position in which the second axis is not coaxially aligned with the first axis, and a second housing position in which the second axis is coaxially aligned with the first axis;
a first drive coupler located at a distal end of the first auger screw and offset from the first axis;
a drive sleeve located at a proximal end of the second auger screw and rigidly connected to the second auger screw, the drive sleeve comprising at least one slot offset from and extending parallel to the second axis; and
a second drive coupler comprising a slider extending along the second axis, and at least one cog extending radially with respect to the second rotation axis from a first portion of the slider, the second drive coupler is located at the proximal end of the second auger screw and offset from the second axis, the second drive coupler extending into the slot and being movable within the slot parallel to the second axis between a first coupler position in which the second drive coupler is in driving connection with the first drive coupler when the second housing is in the second housing position, and a second coupler position in which the second drive coupler is not in driving connection with the first drive coupler when the second housing is in the second housing position;
wherein the drive sleeve further comprises a first bearing surface slidingly receiving the first portion of the slider, the second auger screw comprises a second bearing surface slidingly receiving a second portion of the slider, and further comprising a spring located between the first portion of the slider and the second bearing surface.

8. The foldable auger of claim 6, wherein the first drive coupler comprises a centering post extending along the first axis, and the second drive coupler comprises a centering post receptacle extending along the second axis and configured to receive the centering post when the second housing is in the second housing position.

9. The foldable auger of claim 1, wherein the first drive coupler comprises one or more first cogs extending parallel to the first axis, and the second coupler comprises one or more second cogs extending parallel to the second axis.

10. The foldable auger of claim 1, further comprising a motor configured to:
apply an operating torque to rotate the first auger screw about the first axis, and wherein the first drive coupler is configured to transmit at least a portion of the operating torque to the second drive coupler when the second housing is in the second housing position and the second drive coupler is in the first coupler position; or
apply an operating torque to rotate the second auger screw about the first axis, and wherein the second drive coupler is configured to transmit at least a portion of the operating torque to the first drive coupler when the second housing is in the second housing position and the second drive coupler is in the first coupler position.

11. An agricultural combine comprising:
a grain hopper; and
foldable auger operatively connected to the grain hopper, the foldable auger comprising:
- a first auger assembly comprising a first housing extending along a first axis, and a first auger screw mounted within the first housing to rotate about the first axis;
- a second auger assembly comprising a second housing extending along a second axis, and a second auger screw mounted within the second housing to rotate about the second axis the second auger screw comprising a hollow shaft having a support plate located therein, the support plate comprising a bearing passage extending along the second axis;
- a pivot joining a distal end of the first housing to a proximal end of the second housing, the pivot being configured to permit the second auger assembly to move relative to the first auger assembly between a first housing position in which the second axis is not coaxially aligned with the first axis, and a second housing position in which the second axis is coaxially aligned with the first axis;
- a first drive coupler located at a distal end of the first auger screw and offset from the first axis;
- a drive sleeve located at a proximal end of the second auger screw and rigidly connected to the second auger screw fixed between the proximal end of the second auger screw and the support plate, the drive sleeve comprising at least one slot extending parallel to the second axis; and
- a second drive coupler comprising a slider extending along the second axis and slidably received within the bearing passage and located at the proximal end of the second auger screw and offset from the second axis, the second drive coupler extending into the slot and being movable within the slot parallel to the second axis between a first coupler position in which the second drive coupler is in driving connection with the first drive coupler when the second housing is in the second housing position, and a second coupler position in which the second drive coupler is not in driving connection with the first drive coupler when the second housing is in the second housing position,
- at least one spring is located within the hollow shaft between the drive sleeve and the support plate,
- the support plate comprises a bearing passage extending along the second axis, and the second drive coupler comprises a slider extending along the second axis and slidably received within the bearing passage.

12. The agricultural combine of claim 11, wherein the drive sleeve further comprises an annular ring and the at least one slot is formed by a gap in the annular ring.

13. The agricultural combine of claim 11, wherein the drive sleeve and the support plate are interconnected to form a subassembly that is attached as a unit to the second auger screw.

14. The agricultural combine of claim 11, wherein the second drive coupler comprises a slider extending along the second axis, and at least one cog extending radially with respect to the second rotation axis from a first portion of the slider.

15. The agricultural combine of claim 14, wherein the drive sleeve further comprises a first bearing surface slidingly receiving the first portion of the slider, the second auger screw comprises a second bearing surface slidingly receiving a second portion of the slider, and further comprising a spring located between the first portion of the slider and the second bearing surface.

16. The agricultural combine of claim 14, wherein the first drive coupler comprises a centering post extending along the first axis, and the second drive coupler comprises a centering post receptacle extending along the second axis and configured to receive the centering post when the second housing is in the second housing position.

17. The agricultural combine of claim 11, wherein the first drive coupler comprises one or more first cogs extending parallel to the first axis, and the second coupler comprises one or more second cogs extending parallel to the second axis.

* * * * *